US008229669B2

(12) United States Patent
Roumeliotis et al.

(10) Patent No.: US 8,229,669 B2
(45) Date of Patent: Jul. 24, 2012

(54) NAVIGATION SYSTEM IMPLEMENTING DYNAMIC ROUTE CORRECTION

(75) Inventors: Tasso Roumeliotis, Orinda, CA (US);
Scott A. Hotes, Berkeley, CA (US);
Jesse Myers, San Francisco, CA (US);
Richard Fromm, Berkeley, CA (US);
Joseph Augst, Alameda, CA (US)

(73) Assignee: WaveMarket, Inc., Emeryville, CA (US)

( * ) Notice: Subject to any disclaimer, the term of this patent is extended or adjusted under 35 U.S.C. 154(b) by 774 days.

(21) Appl. No.: 12/347,944

(22) Filed: Dec. 31, 2008

(65) Prior Publication Data

US 2009/0171577 A1 Jul. 2, 2009

Related U.S. Application Data

(60) Provisional application No. 61/009,580, filed on Dec. 31, 2007.

(51) Int. Cl.
*G01C 21/00* (2006.01)
(52) U.S. Cl. .......................... 701/445; 701/209; 701/400
(58) Field of Classification Search .................. 701/209, 701/400, 445
See application file for complete search history.

(56) References Cited

U.S. PATENT DOCUMENTS

| 5,774,824 | A | * | 6/1998 | Streit et al. | 701/207 |
| 6,801,850 | B1 | * | 10/2004 | Wolfson | 701/209 |
| 6,975,941 | B1 | * | 12/2005 | Lau et al. | 701/491 |
| 2005/0102098 | A1 | * | 5/2005 | Montealegre et al. | 701/209 |
| 2007/0288166 | A1 | * | 12/2007 | Ockerse et al. | 701/224 |

* cited by examiner

*Primary Examiner* — Robert M. Pond
(74) *Attorney, Agent, or Firm* — Dovas Law, P.C.

(57) ABSTRACT

A computer-implemented navigation method for implementation during a navigation routine for directing a user is provided. The navigation method comprises generating a navigation route. GPS signals are received and position fixes are derived from the GPS signals. The position fixes are stored and compared with the navigation route. A threshold value is determined based on the comparison of the position fixes with the navigation route. An updated navigation route is generated based on the plurality of position fixes distanced from the navigation route a distance greater than the threshold value and an updated navigation route is not generating based on the plurality of position fixes distanced from the navigation route a distance not greater than the threshold value. A mobile device for performing a navigation procedure is also provided.

16 Claims, 4 Drawing Sheets

NAVIGATION SYSTEM IMPLEMENTING DYNAMIC ROUTE CORRECTION

CROSS REFERENCE TO RELATED APPLICATION(S)

This application claims the benefit of U.S. Provisional Patent Application No. 61/009,580, filed Dec. 31, 2007, which is incorporated by reference as if fully set forth.

BACKGROUND

GPS-based turn-by-turn navigation systems must effectively manage inaccurate GPS fixes during a navigation routine. This is especially true in certain environments such as urban areas, so-called "urban canyons", where the statistical variance of the GPS output can vary widely. The determination of whether or not a user has veered off-route during the navigation routine, and thus whether or not an application should reroute the user is an important, non-trivial decision that directly effects user experience.

Navigation systems rely on algorithmic heuristics to determine if and when a user has diverted from a route generated for them by the system. For example, the user may have missed a turn, or turned incorrectly. Once a navigation system has determined that the user has veered off-route, the system will typically compute an updated route and provide the new route to the user. Off-route heuristics of known systems typically include a number of fixed, distance-based parameters or thresholds. Such heuristics may enable a process for example in which a latest GPS position fix locates a user at X meters from a proscribed route, where if X is greater than a predetermined fixed threshold T distance, such as 200 meters, the user is considered off-route and rerouting is triggered. Due to the dynamic nature of GPS-based location accuracy, choosing a fixed threshold (or thresholds) often leads to an incorrect determination that a user is off-route resulting in unnecessary and confusing rerouting of the user.

There is a growing demand for voice-prompted turn-by-turn navigation systems, including navigation systems incorporated into mobile cellular devices and specialized hardware devices, including for example GPS-enabled cellular telephones and portable navigation devices "PNDs". These systems leverage GPS technology, including assisted GPS variants, to provide location and navigation services.

It would be desirable to provide a system or method for managing and correcting inaccurate GPS fixes determined by a navigation system. Such a system or method should implement navigation routines with reduced occurrences of incorrect off-route determinations and reduced occurrences of erroneous rerouting.

SUMMARY

The present invention provides a computer-implemented navigation method for implementation during a navigation routine for directing a user. The navigation method comprises generating a navigation route. GPS signals are received and position fixes are derived from the GPS signals. The position fixes are stored and compared with the navigation route. A threshold value is determined based on the comparison of the position fixes with the navigation route. An updated navigation route is generated based on the plurality of position fixes distanced from the navigation route a distance greater than the threshold value and an updated navigation route is not generating based on the plurality of position fixes distanced from the navigation route a distance not greater than the threshold value.

The present invention further provides a mobile device including a memory with instructions operable to enable the mobile device to perform a navigation procedure. The enabled navigation procedure includes generating a navigation route, receiving GPS signals and deriving position fixes from the GPS signals, storing the position fixes and comparing the position fixes with the navigation route, and determining a threshold value based on the comparison of the position fixes with the navigation route. The enabled navigation procedure further includes generating an updated navigation route if one or more of the plurality of position fixes is distanced from the navigation route a distance greater than the threshold value

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

Figure 1:
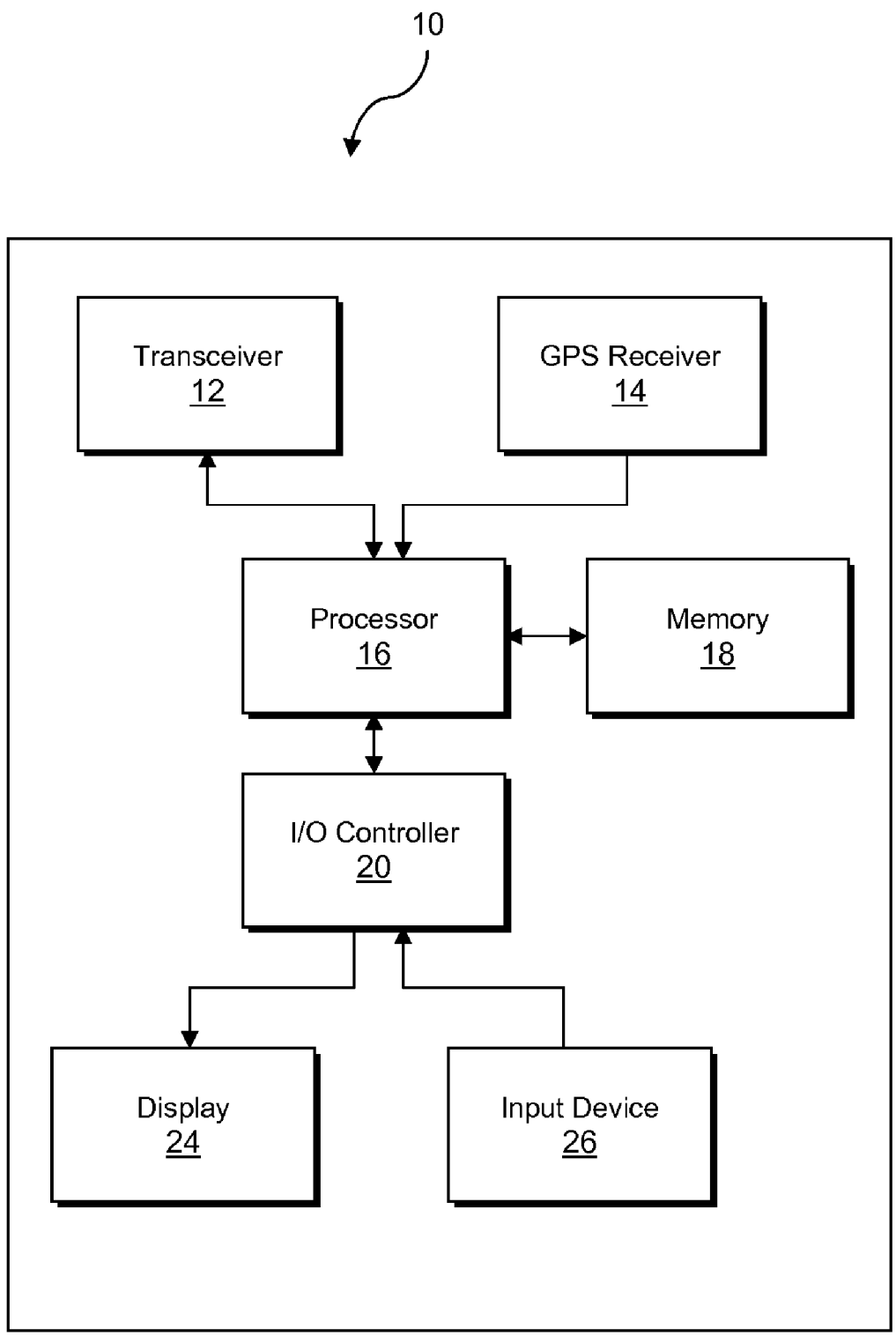
FIG. 1 shows a mobile device according to a preferred embodiment of the invention.

Certain terminology is used in the following description for convenience only and is not limiting. The words "a" and "one" are defined as including one or more of the referenced item unless specifically stated otherwise. This terminology includes the words above specifically mentioned, derivatives thereof, and words of similar import. The phrase "at least one" followed by a list of two or more items, such as A, B, or C, means any individual one of A, B or C as well as any combination thereof.

The preferred embodiments of the present invention are described below with reference to the drawing figures where like numerals represent like elements throughout.

Referring to FIG. 1, a mobile device 10 according to a preferred embodiment of the present invention is shown. The mobile device 10 preferably includes a transceiver 12 for transmitting data to and receiving data from a communication infrastructure of a telecommunication carrier. A GPS receiver 14 is configured to receive GPS signals from satellite or ground stationed transmitters. The transceiver 12 and the GPS receiver 14 may alternatively be provided as a single device. A processor 16 connected to a memory 18 is configured to perform GPS navigation including methods described in the following description. A display 24 and an input device 26 are connected to the processor via an input/output controller 20.

Figure 2:
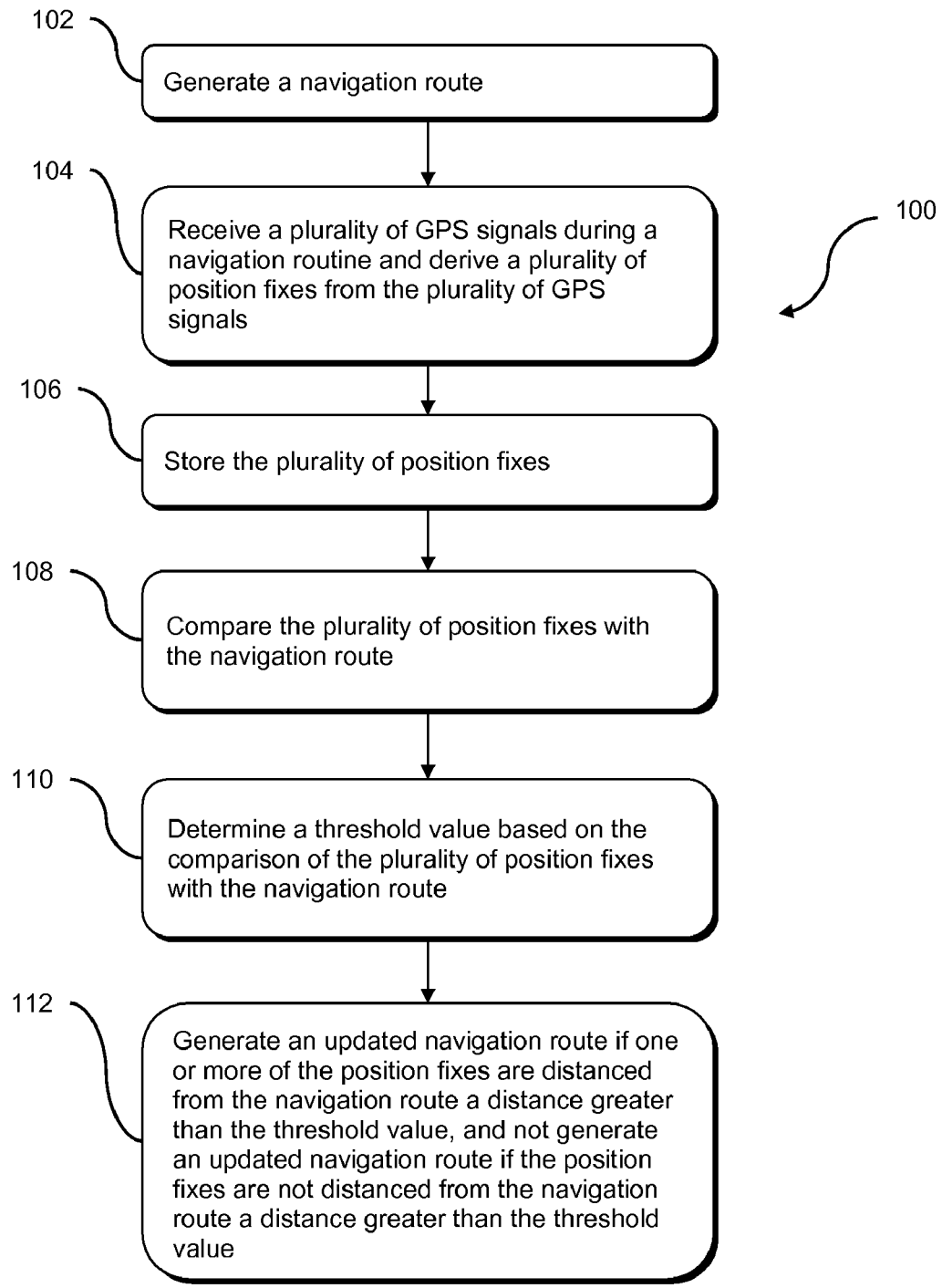
FIG. 2 is a flow chart showing a computer-implemented navigation method according to a preferred embodiment of the invention.

Referring to FIG. 2, a computer-implemented navigation method 100 for implementation during a navigation routine to direct a user according to a preferred embodiment of the present invention is shown. The method 100 is described below with reference to the components of the mobile device 10. Alternatively, the method 100 may be performed using any suitably configured mobile device. In the method 100, a navigation route is generated by the processor 16 (step 102). The navigation route is preferably generated based on user input regarding one or more desired destinations received via the input device 26. A suitable visual representation of the navigation route is preferably provided by the processor 16 via the display 24. A plurality of GPS signals are received with the GPS receiver 14 during the navigation routine. The processor 16 derives a plurality of position fixes from the plurality of GPS signals (step 104). The position fixes are preferably derived from GPS signals in a known manner using trilateration principles. The position fixes are stored in a memory 18 (step 106). Using the processor 16, the plurality of position fixes are compared with a navigation route (step 108), and a threshold value is determined based on the comparison of the plurality of position fixes with the navigation route (step 110). The processor 16 generates an updated navigation route if, depending on a predetermined heuristic, one or more of the plurality of position fixes is distanced from the navigation route a distance greater than the threshold value, and the processor 16 does not generate an updated navigation route if the plurality of position fixes are not distanced from the navigation route a distance greater than the threshold value (step 112).

Figure 3:
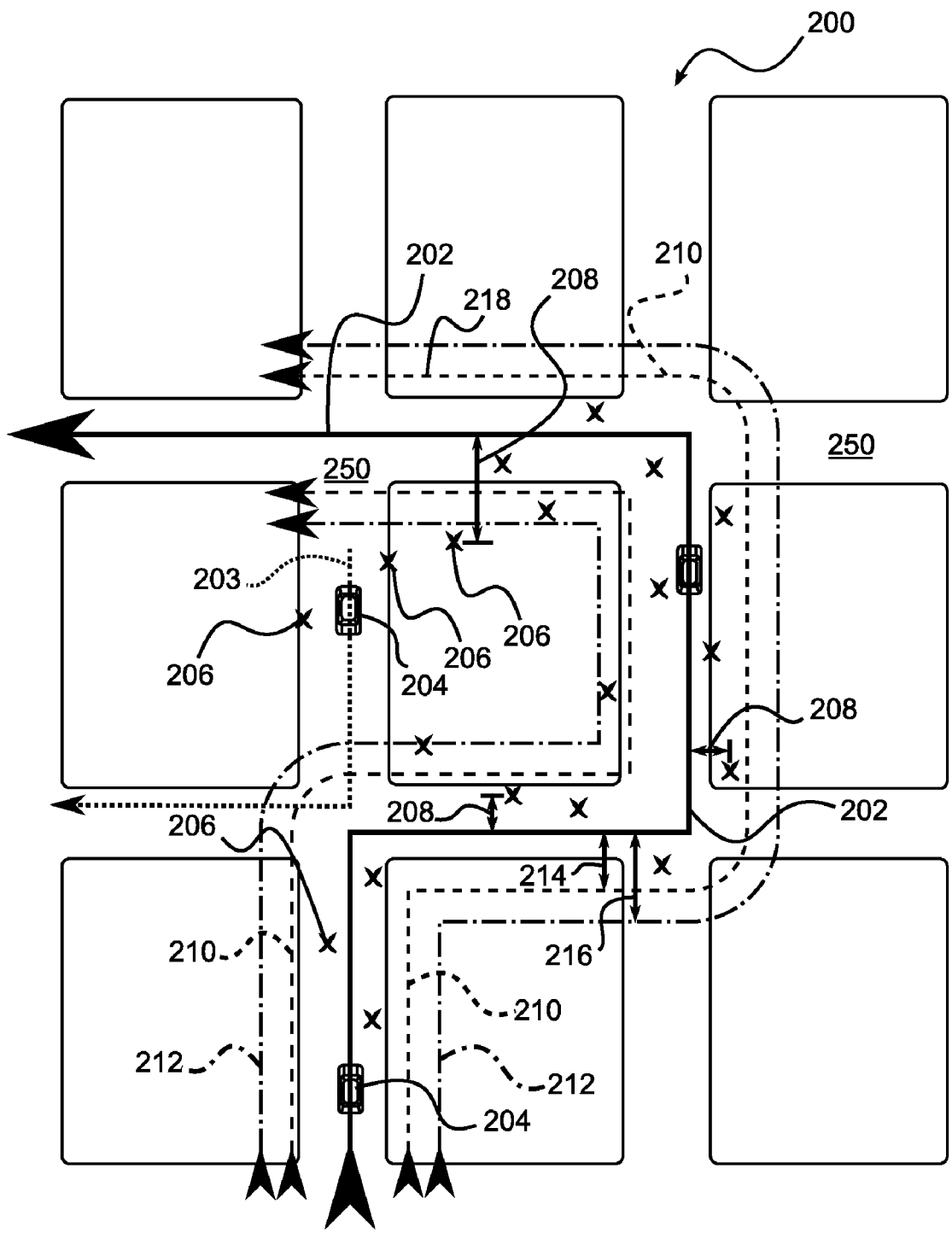
FIG. 3 is a plan view of an example city streetscape in which a navigation method according to a preferred embodiment of the invention is implemented.

Referring to FIG. 3, a streetscape 200 is shown depicting implementation of the method 100 according to a preferred embodiment of the invention. A navigation route 202 generated according to the method 200 is shown on roads 250 comprising navigable paths of the streetscape 200. A vehicle 204, including the mobile device 10 or other suitable device for implementing the method 100, is shown following the navigation route 202. Position fixes 206 derived according to the method 100 from GPS signals are shown in representative positions relative to the navigation route 202.

In the method 100, comparing the plurality of position fixes 206 with the navigation route 202 preferably includes determining a distance 208 from each of the plurality of position fixes to the navigation route 202. The distance 208 is, as shown, preferably the shortest distance from each position fix 206 to the navigation route 202. Based on the computed shortest distances of a predetermined number of the most recent position fixes 206, a statistical variance is computed from which a standard deviation, or alternatively, a modified standard deviation is derived. From the standard deviation or modified standard deviation the threshold value is preferably derived. The threshold value preferably comprises a computation of a multiple of the standard deviation or modified standard deviation, or alternatively, is derived from the variance, standard deviation, or modified standard deviation in another suitable manner. A preferred manner of computing the threshold value is shown in Equation 1 below where threshold value is indicated by T, a predetermined constant offset is indicated by C, a multiplier is indicated by M, and the derived standard deviation is represented by σ. The constant C and multiplier M are preferably selected based on the particular geographic environment in which the navigation routine is performed. In a city location having a high street density, the constant C may be set to about 50 meters and the multiplier M may be set to about 1.0. In rural areas having a low street density, the constant C may be set to about 200 meters and the multiplier M may be set to about 1.5. Conversely, a city location with many high buildings may require a relatively higher constant C and multiplier M to compensate for GPS signal inaccuracies resulting from interference.

$$T = C + M\sigma \qquad \text{Equation 1}$$

For purposes of illustration in FIG. 3, standard deviation lines 210 represent approximately instantaneous positive and negative standard deviations 214 of the predetermined number of the most recent position fixes as measured from the navigation route 202. Threshold value lines 212 represent approximately instantaneous positive and negative threshold values 216 as measured from the navigation route 202.

The statistical variance is preferably recalculated in a dynamic manner based upon each new position fix derived from newly received GPS signals, and the least recent of the predetermined number of the most recent position fixes is preferably dropped from the variance calculation with each newly derived position fix. For example, the computation of variance may continuously use 1000 of the most recent position fixes and may be recalculated with each new one position fix, dropping the least recent one position fix. Alternatively, the statistical variance is recalculated based upon receipt of signals corresponding to more than one new position fix. For example, the computation of variance may use 1000 of the most recent position fixes and may be recalculated with each group of 15 newly derived position fixes, dropping the least recent 15 position fixes. Further, of the predetermined number of most recent position fixes used for the computation of variance, newer position fixes may be weighted more heavily, for example weighting with exponential drop-off WRT age of position fix. The standard deviations 214 and resultant threshold values 216 are updated as the statistical variance is updated dynamically, and accordingly, vary continuously or at predefined intervals along the navigation route 202.

For purposes of visualization in the example of FIG. 3, an updated navigation route 203 indicates a direction in which the vehicle 204 has veered off the navigation route 202. Using a predetermined heuristic based on the instantaneous threshold value 216, the processor 16 is triggered to generate the updated navigation route 203. Preferably, the predetermined heuristic requires that at least three position fixes 206 are consecutively disposed distanced from the navigation route 202 on one side of the navigation route in excess of their respective instantaneous threshold values 216 to trigger generation of an updated navigation route 203. Alternatively, any suitable number of position fixes, one or more, distanced from the navigation route 202 a distance greater than their respective instantaneous threshold values 216 may trigger generation of an updated navigation route 203. Alternatively, the predetermined heuristic may be further based on the mapped streetscape data, wherein the updated navigation route 203 is generated if one or more position fixes 206 is distanced from the navigation route 202 a distance greater than the threshold value 216 and if the one or more position fixes is within a predetermined distance of a navigable path, such as one of the roads 250, on which the navigation route is not currently generated. In such manner, an updated navigation route 203 may only be generated when a navigable path is present to support travel.

Alternatively, generation of an updated navigation route 203 is triggered based on receiving GPS signals corresponding to a plurality of position fixes 206 disposed consecutively or substantially consecutively on one side of the navigation route 202, distanced from the navigation route 202 in excess of their respective instantaneous threshold values 216 for a predetermined distance along the navigation route 202. The predetermined distance along the navigation route 202 may correspond for example to 200 meters or the length of a city block such that if all or substantially all of the position fixes 206 are disposed consecutively or substantially consecutively on one side of the navigation route 202, distanced from the navigation route 202 in excess of their respective instantaneous threshold values 216 for 200 meters or a length of a city block, generation of an updated navigation route 203 is triggered. Alternatively, generation of an updated navigation route 203 is triggered based on receiving GPS signals corresponding to a plurality of position fixes 206 being disposed consecutively or substantially consecutively on one side of the navigation route 202, distanced from the navigation route 202 in excess of their respective instantaneous threshold values 216 for a predetermined period of time, for example 15 seconds.

The computation of the threshold values 216 may be further based on position fixes 206 obtained during a prior navigation routine of the user of the mobile device 10, wherein data pertaining to the position fixes 206 of the prior navigation routine is stored in the memory 18 of the processor 16. Alternatively, the computation of the threshold values 216 may be further based on position fixes 206 obtained during a prior navigation routine of another user using a compatible mobile device, wherein data pertaining to the position fixes 206 of the prior navigation routine are preferably received from a telecommunication carrier infrastructure via the transceiver 12.

Figure 4:
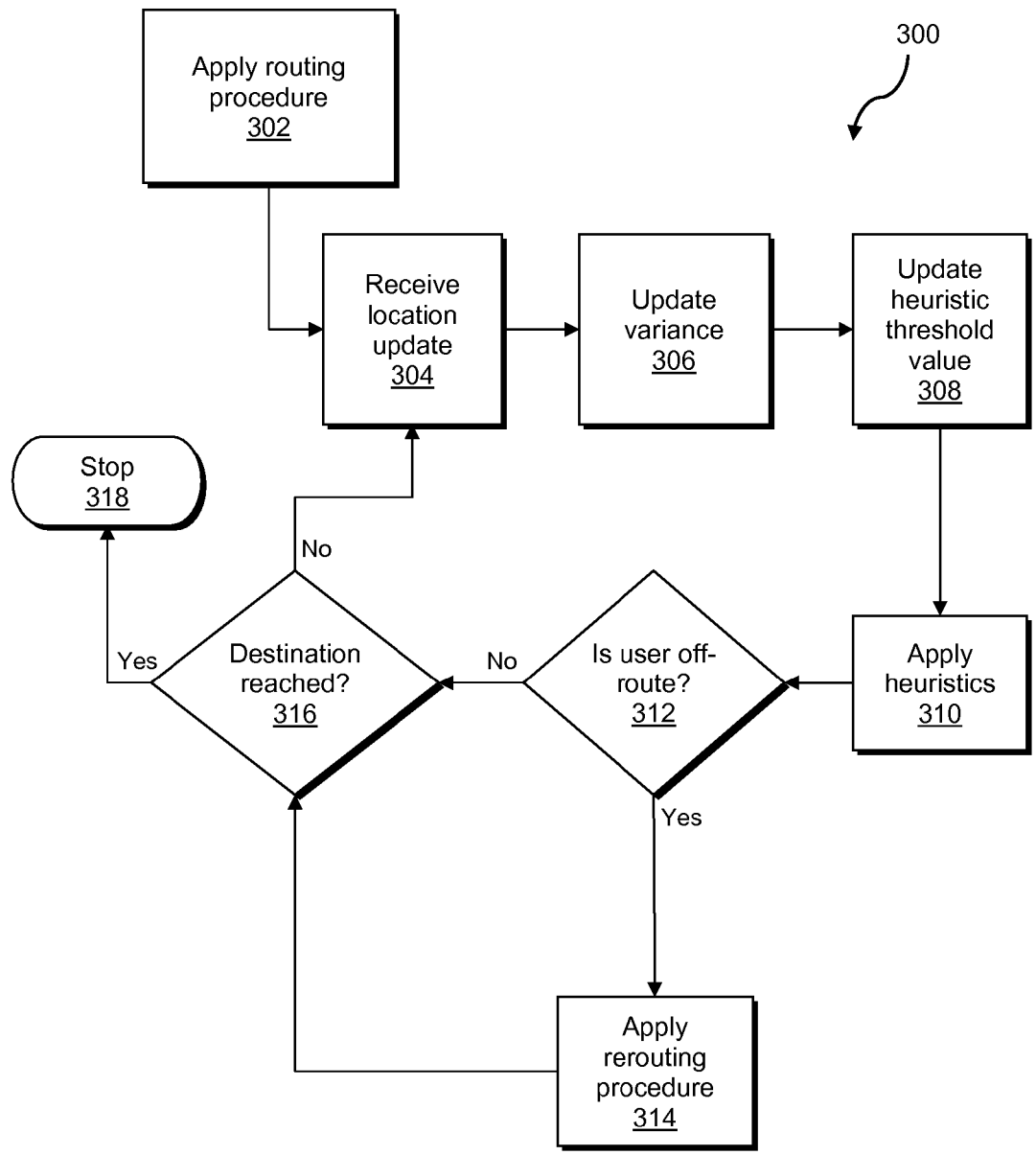
FIG. 4 is flow chart depicting a routing decision process of a navigation routine according to a preferred embodiment of the invention.

FIG. 4 shows a flowchart according to a preferred embodiment of the invention depicting a routing decision process 300 of a navigation routine run on a mobile device in use by a user. The routing decision process 300 includes applying a routing procedure (step 302) in which a navigation route is generated. A location update is received (step 304), preferably in the form of a plurality of satellite or tower-based GPS signals used to derive position fixes. A computation of variance of the position fixes with respect to the navigation route is updated based on the received location update (step 306). A threshold value is updated based on the updated variance (step 308). One or more heuristics are applied using the updated threshold value (step 310). A determination is made based on the results of the applied heuristics of whether the user is off-route (step 312). A rerouting procedure is performed if the user is determined to be off-route (step 314). A determination is made of whether a destination is reached (step 316). If a destination is reached, the process ends at step 318. If a destination is not reached, the process returns to step 304 to receive a location update.

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A computer-implemented navigation method for implementation during a navigation routine to direct a user, the navigation method comprising:
generating a navigation route;
receiving a plurality of GPS signals and deriving a plurality of position fixes from the plurality of GPS signals;
storing the plurality of position fixes;
comparing the plurality of position fixes with the navigation route;
determining at least one threshold value based on the comparison of the plurality of position fixes with the navigation route; and
at least one of generating an updated navigation route to direct the user based on at least one of the plurality of position fixes being distanced from the navigation route a distance greater than the threshold value and not generating an updated navigation route based on the plurality of position fixes not being distanced from the navigation route a distance greater than the threshold value.

2. The computer-implemented method of claim 1, further comprising:
determining a distance from each of the plurality of position fixes to the navigation route; and
deriving the threshold value from the determination of the distances from the each of the plurality of position fixes to the navigation route.

3. The computer-implemented method of claim 1, further comprising:
determining a shortest distance from each of the plurality of position fixes to the navigation route; and
deriving the threshold value from the determination of the shortest distances.

4. The computer-implemented method of claim 3, further comprising deriving the threshold value as a factor of the standard deviation of the shortest distances from the each of the plurality of position fixes to the navigation route.

5. The computer-implemented method of claim 1, further comprising:
determining a shortest distance from each of the plurality of position fixes to the navigation route;
determining a statistical variance from the shortest distances; and deriving the threshold value from the statistical variance.

6. The computer-implemented method of claim 1, further comprising:
receiving the plurality of GPS signals and deriving the plurality of position fixes at least one of continuously and at predetermined intervals; and
determining the threshold value based on the comparison of the plurality of position fixes with the navigation route at least one of continuously and at predetermined intervals.

7. The computer-implemented method of claim 6, further comprising determining the threshold value upon each new derivation of a position fix.

8. The computer-implemented method of claim 6, further comprising determining the threshold value based on the comparison of a predetermined number of the most recent of the plurality of position fixes with the navigation route.

9. The computer-implemented method of claim 1, further comprising determining the threshold value based on the comparison of the plurality of position fixes with the navigation route at least one of continuously and at predetermined intervals, wherein a predetermined number of the most recent position fixes are weighted greater than earlier position fixes in determining the threshold value.

10. The computer-implemented method of claim 1, further comprising determining the threshold value based on position fixes obtained during a prior navigation routine.

11. The computer-implemented method of claim 1, further comprising determining the threshold value based on position fixes obtained during a prior navigation routine of another user.

12. The computer-implemented method of claim 1, further comprising generating the updated navigation route based on at least one of the most recent plurality of position fixes distanced from the navigation route a distance greater than the threshold value.

13. The computer-implemented method of claim 1, further comprising generating the updated navigation route based on at least two consecutive ones of the most recent plurality of position fixes distanced from the navigation route a distance greater than the threshold value.

14. A mobile device including at least one memory comprising instructions operable to enable the mobile device to perform a procedure comprising:
- generating a navigation route to provide directions over a mapped area comprising a plurality of navigable paths;
- receiving a plurality of GPS signals and deriving a plurality of position fixes from the plurality of GPS signals;
- storing the plurality of position fixes;
- comparing the plurality of position fixes with the navigation route;
- determining a threshold value based on the comparison of the plurality of position fixes with the navigation route; and
- generating an updated navigation route if at least one of the plurality of position fixes is distanced from the navigation route a distance greater than the threshold value.

15. The mobile device of claim 14, wherein the at least one memory is further enabled to perform a procedure comprising generating the updated navigation route if at least three consecutive ones of the most recent plurality of position fixes are distanced from the navigation route a distance greater than the threshold value on one side of the navigation route.

16. The mobile device of claim 14, wherein the at least one memory is further enabled to perform a procedure comprising generating the updated navigation route if the at least one of the plurality of position fixes is distanced from the navigation route a distance greater than the threshold value and if the at least one of the plurality of position fixes is within a predetermined distance of a navigable path on which the navigation route is not generated.

* * * * *